Patented Mar. 16, 1954

2,672,440

UNITED STATES PATENT OFFICE 2,672,440

PRODUCTION OF ALCOHOLS FROM OLEFINIC COMPOUNDS BY ELECTRICAL DISCHARGE

Herman Johannes den Hertog and Pieter Bruin, Amsterdam, Netherlands, assignors to Shell Development Company, Emeryville, Calif., a corporation of Delaware No Drawing. Application August 3, 1951, Serial No. 240,285

Claims priority, application Netherlands August 7, 1950

13 Claims. (Cl. 204—169)

This invention relates to a process whereby olefinic compounds are reacted with water in the presence of silent electric discharges to form saturated hydroxy-substituted products made up in major portion of compounds having a larger number of carbon atoms than the olefinic reactant employed as the starting compound.

It is known that when readily ionizable compounds of the type of HOH and HCl are reacted with unsymmetrical aliphatically unsaturated compounds, an addition reaction takes place whereby the negative ion (OH— or Cl—) adds to the unsaturated carbon atom having the fewer hydrogen atoms. This type of addition, the rule of which was first postulated by Markownikoff, is termed "normal" to distinguish it from the "abnormal" addition which takes place when the negative hydroxy or halogen ion adds to the unsaturated carbon atom carrying the greater number of hydrogen atoms.

The present invention is based on the discovery that when olefinically unsaturated compounds are reacted with water in the vapor phase and under the influence of dark, silent electric discharges (so-called ozonization discharges), there are formed saturated product compounds having a greater number of carbon atoms than the starting olefinic reactant, wherein the respective hydrogen and hydroxy portions of the HOH have added abnormally to the olefinically bonded carbon atoms. At the same time there are formed, in minor amount, various hydroxy-substituted reaction products having the same number of carbon atoms as the unsaturated reactant.

The unsaturated organic compounds which can be treated in accordance with the process of this invention are those which contain one or more olefinic double bonds in the molecule. Representative reactants of this class are ethylene, propylene, 1-butene, 2-butene, isobutene, 1-pentene, 2-pentene, 1-hexene, 4-methyl-1-pentene, 1-octene, 1-decene, 1,3-butadiene, 1,3-pentadiene and the like. A preferred class of reactants comprises the lower alkenes, namely ethylene, propylene, 1-butene, 2-butene, isobutene and the pentenes, together with the higher alkenes, such as branched- or straight-chain hexenes, heptenes and octenes which vaporize below about 150° C. These unsaturated reactants can be used either singly or in admixture with one another and/or with various diluent gases, such as ethane, hydrogen, nitrogen, carbon dioxide or the like. Particularly valuable mixtures of this type are those such as the ethane-ethene, propane-propene and butane-butene mixtures which are obtained by fractionation of the gases produced in the cracking of mineral oils.

When an alkene of the general formula $C_nH_{2n}$ is reacted with water, a primary alcohol of the general formula $C_{2n}H_{4n+1}OH$ is obtained as the main product, together with minor amounts of alcohols having three times the number of carbon atoms as the starting material, as well as aldehydes and alcohols which correspond in number of carbon atoms to the alkene used. Thus, when ethylene is reacted with water under the influence of silent electric discharges, there are produced, in addition to 1-butanol, minor amounts of a primary hexanol and of acetaldehyde and ethanol. With propylene, the major product of the reaction is a primary hexanol, though there are also produced lesser amounts of 1-propanol, 2-propanol and propanal.

From a study of the constitution of the higher molecular weight reaction products obtained by the practice of the present invention, it has been found that the coupling of the two alkene molecules takes place between secondary carbon atoms or, in the case of tertiary alkenes, between tertiary carbon atoms. Thus, 2,3-dimethyl-1-butanol is obtained by reacting water with propene under the influence of silent electric discharges, whereas with isobutene the product is 2,2,3,3-tetramethyl-1-butanol.

While the process of the present invention can be carried out using but the theoretically required reactant proportions, i. e., approximately two moles of the unsaturated reactant per mole of water, there is preferably employed an excess of the water, and particularly good results have been obtained by using from about 4 to 10 moles of water per mole of the olefinic reactant.

Any apparatus in which silent electric discharges can be created in a discharge space, such as an ozonizer, can be employed. Such units usually consist of a condenser-type apparatus, with the discharge taking place in the space between the two insulated electrodes through which the gaseous reaction mixture is passed. The frequency of the discharges can amount to from about 50 to 1000 periods per second, and voltages of from about 5000 to 25,000 volts have given good results, though voltages as high as 50,000 volts can also be utilized with good effect.

The period of time during which the gaseous reaction mixture is exposed to the silent electric discharges is, in most cases, relatively short. Thus, good results have been obtained with periods of from about 3 to 60 seconds, though somewhat longer or even shorter periods can be employed.

The process of this invention is one which takes place in the gaseous phase, and the temperature and pressure should be so adjusted that substantially no liquid is present in the reaction chamber. In this connection, good results have been obtained with temperatures of from about 50 to 250° C., and a preferred temperature range is from about 50 to 150° C. Even lower temperatures than this can be employed. Temperatures above 250° C. are normally undesirable since side reactions then occur to an unduly large extent. The process can be carried out under atmospheric, subatmospheric, or superatmospheric pressures. Atmospheric pressures are normally employed, though reduced pressures have proven effective when dealing with materials having a tendency to assume the liquid form at the reaction temperatures employed.

In many cases, it is found advantageous to add hydrogen to the reaction mixture, for example, in quantities of from about 10 to 50% by volume of said mixture, since it has been found that the hydrogen acts to increase the yield of the desired reaction products and at the same time suppress the formation of undesirable by-products such as alkynes.

The hydroxy- and chloro-substituted products obtained by a practice of this invention can be separated from the reaction mixture discharged from the ozonizer in any desired manner, as by fractional distillation under normal or reduced pressures. Any unconverted amounts of the unsaturated reactant can be recovered and used again in the process. The alcohols thus recovered can be employed as solvents for various resins, lacquers and the like, and they are also useful as intermediates from which other compounds can be obtained. Thus, they can be hydrogenated to provide hydrocarbons having a high octane number which are suitable as motor fuels or components thereof.

While the process of the present invention can take place in a batch, or discontinuous manner, it is especially suited for continuous operation, with the vaporous mixture to be converted being continuously introduced into a reaction space which is maintained at the required temperature, and wherein the mixture is exposed to silent electric discharges as it passes through the reaction space and out of the apparatus.

The process of the invention is illustrated by the following examples:

*Example I*

A mixture of 1 mole ethene, 6 moles water and 3 moles hydrogen was fed in vapor form at atmospheric pressure, and at a rate of 21.6 liters per hour, through a glass ozonizer wherein the temperature was maintained at 80 to 85° C. and in which the distance between the inner and outer tube amounted to 4 mm. The volume of the discharge chamber was 115 cc. The mixture was exposed in this ozonizer to silent electric discharges with a potential difference of 20,000 volts and 50 periods per second. The reaction mixture discharged from the ozonizer was conducted via a cooler to a receiver and to a condensation vessel behind it cooled at —60° C. The experiment ended after 32.4 liters of ethene (1 atm., 20° C.) had been passed through in 15 hours. The heterogeneous liquid mixture which had collected in the receiver was now distilled until pure water came over and the distillate was saturated with potash. After drying, the oil layer thus separated off was fractionally distilled together with the liquid which had separated off in the condensation vessel, so that a fraction which boiled up to 40° C. and consisted largely of ethanal, distilled over. After drying the residue (about 8 g.) on sodium sulphate, distillation was continued, whereby, calculated on introduced ethene, 8 mole % of 1-butanol and 2 mol % of a primary hexanol were recovered, in addition to about 4 mole % of ethanol. A small quantity (about 0.9 g.) of a higher boiling product remained behind. The gas mixture escaping from the condensation vessel contained 4% acetylene and 9.5% alkanes in addition to hydrogen and unconverted ethene. Calculated on converted ethene, the yield of butanol amounted to 12%, of hexanol to 3% and of ethanol to 6%. The quantity of acetaldehyde formed corresponded to a yield of 15%, calculated on converted ethene.

*Example II*

A mixture of 1 mole ethene, 7 moles water and 1 mole hydrogen was conducted at atmospheric pressure in vapor form through a glass ozonizer kept at 90 to 95° C. in which the wall distance amounted to 2.5 mm. and the volume of the discharge chamber to 150 cc., at a rate so that the reaction period amounted to 10 seconds. The mixture was subjected in this ozonizer to the action of silent electric discharges of 20,000 volts and 50 periods per second. The reaction mixture discharged from the ozonizer was worked up as described in Example I, whereby 1-butanol with a yield of 22.5%, calculated on converted ethene, was recovered. In addition to this, acetaldehyde and ethanol, with a yield of 12.5% and 5.5% respectively, also calculated on converted ethene, were obtained.

*Example III*

A mixture of 1 mole propene and 6 moles water was conducted at atmospheric pressure in vapor form through a quartz ozonizer, the distance between the walls of which amounted to 1 mm. and the volume of the discharge chamber to 50 cc., and which was heated in an electric oven at 120° C. The mixture was conducted through the ozonizer at a rate corresponding to a reaction period of 7 seconds and subjected therein to the action of silent electric discharges of 20,000 volts and 50 periods per second.

When working up the reaction mixture in the manner described in Example I, a primary hexanol with a yield of 13.5% and, furthermore, propanal, 1-propanol and 2-propanol, with yields of 3%, 6% and 3%, respectively, calculated on converted propene, were obtained. The primary hexanol was identified as 2,3-dimethyl-1-butanol.

*Example IV*

A mixture of 1 mole propene, 7 moles water and 1 mole hydrogen was conducted at atmospheric pressure through the ozonizer described in Example II at a temperature of 90 to 95° C. and at a rate corresponding to a reaction period of 10 seconds, and exposed therein to silent electric discharges of 20,000 volts and 50 periods per second. By working up the reaction mixture in the manner indicated in Example I, 2,3-dimethyl-1-butanol was obtained with a yield of 19.5% and, furthermore, propanal, 1-propanol and 2-propanol, with yields of 7.5%, 8% and 4.5%, respectively, calculated on converted propene, were obtained.

Example V

A mixture of 1 mole isobutene, 6 moles water and 3 moles hydrogen was conducted at atmospheric pressure in vapor form at a rate of 32 liters per hour through the ozonizer described in Example I, which was kept at 80 to 85° C., and exposed therein to silent electric discharges of 20,000 volts and 50 periods per second. The liquid reaction mixture was distilled, and to the distillate potassium carbonate was added, after which the oleaginous liquid was separated off and, after drying on sodium sulphate, was fractionally distilled. A primary octanol was obtained which was identified as 2,2,3,3-tetramethyl-1-butanol, in a yield of 22%, calculated on converted isobutene. Furthermore, 2-methyl-1-propanol, 2-methyl-2-propanol and 2-methyl-propanal, in yields of 15.5%, 10.5% and 7.5%, respectively, also calculated on converted isobutene, were obtained. In addition to hydrogen and unconverted alkene, the gaseous reaction product contained about 8% of alkanes and only 0.1% of alkynes.

The invention claimed is:

1. The method of converting a normally gaseous olefinic hydrocarbon to saturated aliphatic alcohols predominating in primary saturated aliphatic alcohols having twice the number of carbon atoms contained in said normally gaseous olefin, which comprises contacting said normally gaseous olefinic hydrocarbon with water vapor under the influence of a silent electric discharge at a temperature below about 150° C. for a period of not more than about 60 seconds, whereby said normally gaseous olefinic hydrocarbon reacts with said water vapor to form aliphatic alcohols predominating in saturated primary aliphatic alcohols having twice the number of carbon atoms contained in said olefinic hydrocarbon.

2. The process for the conversion of an olefinic hydrocarbon boiling below 150° C. to aliphatic alcohols predominating in saturated aliphatic primary alcohols having twice the number of carbon atoms contained in said olefin which comprises contacting said olefin in the vapor phase with water vapor under the influence of a silent electrical discharge, at a temperature below about 250° C. for a period of not more than about 60 seconds, thereby reacting said olefin with said water vapor with the formation of aliphatic alcohols predominating in saturated aliphatic primary alcohols having twice the number of carbon atoms contained in said olefin.

3. The process in accordance with claim 2 wherein said conversion is carried out in the presence of added hydrogen.

4. The process in accordance with claim 2 wherein said conversion is carried out at a temperature in the range of from about 50° to about 150° C.

5. The process in accordance with claim 2 wherein said conversion is carried out at a temperature in the range of from about 50° to about 150° C. and wherein from about 4 to about 10 mols of water are charged to said conversion per mol of said olefin.

6. The process in accordance with claim 1 wherein said conversion is carried out in the presence of added hydrogen.

7. The process in accordance with claim 1 wherein said conversion is executed using from about 4 to about 10 mols of water per mol of said normally gaseous olefin.

8. The process for the conversion of propylene to aliphatic alcohols consisting predominantly of 2,3-dimethyl-1-butanol which comprises contacting propylene with water vapor under the influence of silent electrical discharge at a temperature between about 50° and 150° C. for a period of time not substantially exceeding about 60 seconds thereby reacting propylene with water with the formation of saturated primary aliphatic alcohols predominating in 2,3-dimethyl-1-butanol.

9. The process in accordance with claim 8 wherein said conversion is effected in the presence of added hydrogen.

10. The process for the conversion of isobutylene to saturated aliphatic primary alcohols predominating in 2,2,3,3-tetramethyl-1-butanol which comprises contacting isobutylene with water vapor under the influence of a silent electrical discharge at a temperature in the range of from about 50° to about 150° C. for a period of time not substantially exceeding about 60 seconds, thereby reacting isobutylene with water with the formation of saturated primary aliphatic alcohols predominating in 2,2,3,3-tetramethyl-1-butanol.

11. The process in accordance with claim 10 wherein said conversion is executed in the presence of added hydrogen.

12. The process for the conversion of ethylene to low boiling saturated primary aliphatic alcohols predominating in 1-butanol which comprises contacting ethylene with water vapor under the influence of silent electrical discharge at a temperature in the range of from about 50° to about 150° C. for a period of time not substantially exceeding about 60 seconds, thereby reacting ethylene with water with the formation of primary saturated aliphatic hydrocarbons predominating in 1-butanol.

13. The process in accordance with claim 12 wherein said conversion is effected in the presence of added hydrogen.

HERMAN JOHANNES den HERTOG.
PIETER BRUIN.

References Cited in the file of this patent

UNITED STATES PATENTS

| Number | Name | Date |
|---|---|---|
| 1,710,155 | Egloff | Apr. 23, 1929 |
| 1,939,018 | Odell | Dec. 12, 1933 |
| 2,045,343 | Darrah | June 23, 1936 |

OTHER REFERENCES

Glockler et al., Electrochemistry of Gases and Other Dielectrics (1939), p. 201.